(12) United States Patent
Libby

(10) Patent No.: US 8,753,125 B1
(45) Date of Patent: Jun. 17, 2014

(54) LANGUAGE STUDY GAME BOARD

(75) Inventor: Arnot Dawn Havis Libby, Heber Springs, AR (US)

(73) Assignee: Arnot Dawn Havis Libby, Heber Springs, AR (US)

( * ) Notice: Subject to any disclaimer, the term of this patent is extended or adjusted under 35 U.S.C. 154(b) by 0 days.

(21) Appl. No.: 12/462,458

(22) Filed: Aug. 4, 2009

(51) Int. Cl.
G09B 19/00 (2006.01)

(52) U.S. Cl.
USPC .......................................................... 434/167

(58) Field of Classification Search
USPC .......... 434/128, 156, 167, 168, 171; 273/236, 273/239, 244, 244.1
See application file for complete search history.

(56) References Cited

U.S. PATENT DOCUMENTS

| | | | | |
|---|---|---|---|---|
| 3,197,891 A | * | 8/1965 | Pierce | 273/269 |
| 4,000,897 A | * | 1/1977 | York | 273/244.2 |
| 4,465,282 A | * | 8/1984 | Dillon | 273/247 |
| 4,470,821 A | * | 9/1984 | LeCapelain | 434/172 |
| 4,478,582 A | * | 10/1984 | Tucker | 434/170 |
| 4,921,251 A | * | 5/1990 | Kanenwisher | 273/244.1 |
| 5,322,292 A | * | 6/1994 | Dileva et al. | 273/244 |
| 5,458,338 A | * | 10/1995 | Beardsley | 273/269 |
| 5,743,740 A | * | 4/1998 | Visser et al. | 434/128 |
| 5,746,431 A | * | 5/1998 | McIntyre et al. | 273/247 |
| 6,076,828 A | * | 6/2000 | McGill | 273/292 |
| 6,120,028 A | * | 9/2000 | Boyer | 273/243 |
| 6,267,376 B1 | * | 7/2001 | Jenkins | 273/258 |
| 6,530,571 B1 | * | 3/2003 | McWilliams | 273/244.2 |
| 6,899,335 B2 | * | 5/2005 | Wilson | 273/317 |
| 7,354,040 B2 | * | 4/2008 | Schneider | 273/239 |
| 2009/0029327 A1 | * | 1/2009 | Jokilehto | 434/128 |

* cited by examiner

Primary Examiner — Kurt Fernstrom

(57) ABSTRACT

The submitted game with folding board stylized like a baseball field is uniquely associated with Baseball, providing entertainment about people or an original learning method to sustain interest and retention of any substituted subject. Rules in an instructive copyrighted Manual simultaneously enhance English use. Also boxed for two to twenty-two players aged five on, are two teams alternating at bat once an inning; laminated picture cards with removable holders represent team manager, umpire and nine members. Each of nine members has playing position originally correlated with the nine speech parts. Defense requires Offense to use speech parts designated at bases to fit the nine designated sentence parts for sentence construction to win with runs and walks. The subject's vocabulary is listed by speech parts, kindergarden through twelve on. After pitcher selects verb for each batter, Offense chooses vocabulary as designated to make and record sentences for reteaching.

6 Claims, 8 Drawing Sheets

Figure 5:
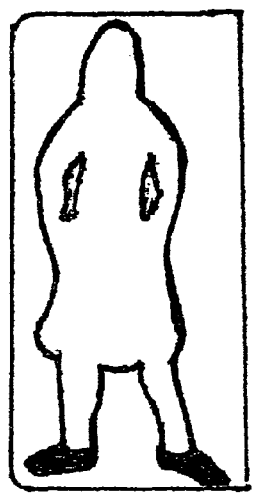

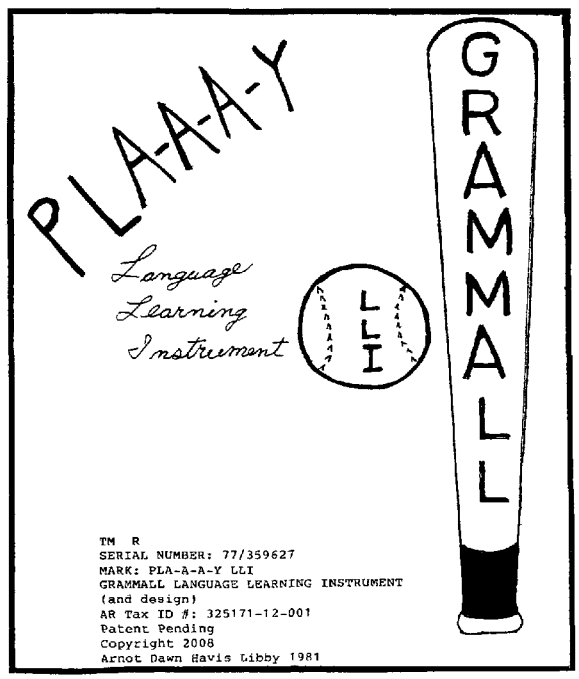
FIG.1 Trademark/Manual Cover

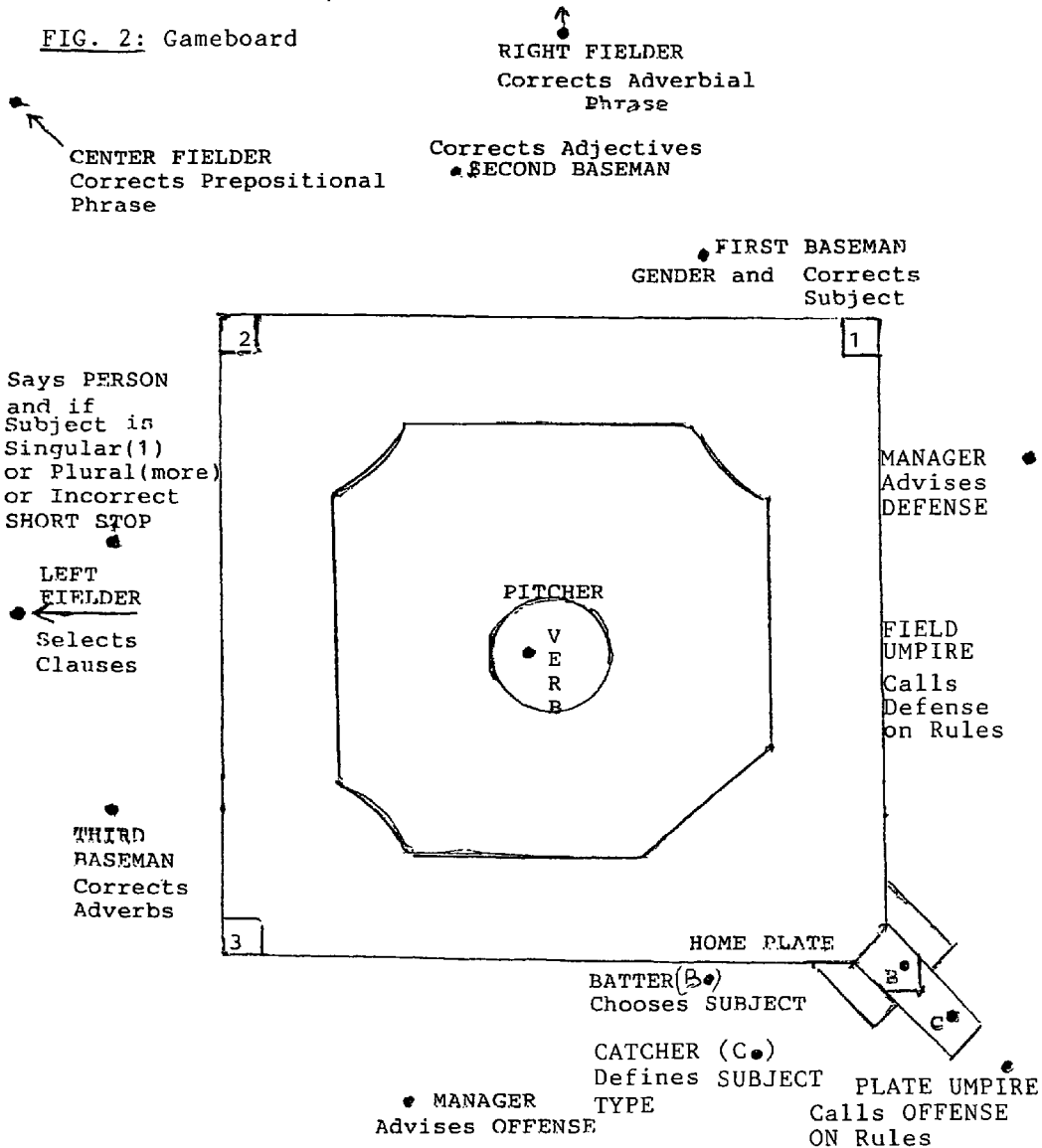
FIG. 2: Gameboard

SCORECARD

| TEAMS: | | | | | | | | | | | TOTALS | | |
|---|---|---|---|---|---|---|---|---|---|---|---|---|---|
| GREEN (Team Names) | | | | | | | | | | | R | W | S |
| Pitcher | | | | | | | | | | | | | |
| Catcher | | | | | | | | | | | | | |
| 1st Baseman | | | | | | | | | | | | | |
| 2nd Baseman | | | | | | | | | | | | | |
| 3rd Baseman | | | | | | | | | | | | | |
| Shortstop | | | | | | | | | | | | | |
| L. Fielder | | | | | | | | | | | | | |
| C. Fielder | | | | | | | | | | | | | |
| R. Fielder | | | | | | | | | | | | | |

S = OUT   R = RUN   W = WALK   S = STRIKE OUT at BAT

| ORANGE (Team Names) | | | | | | | | | | | TOTALS | | |
|---|---|---|---|---|---|---|---|---|---|---|---|---|---|
| | | | | | | | | | | | R | W | S |
| Pitcher | | | | | | | | | | | | | |
| Catcher | | | | | | | | | | | | | |
| 1st Baseman | | | | | | | | | | | | | |
| 2nd Baseman | | | | | | | | | | | | | |
| 3rd Baseman | | | | | | | | | | | | | |
| Shortstop | | | | | | | | | | | | | |
| L. Fielder | | | | | | | | | | | | | |
| C. Fielder | | | | | | | | | | | | | |
| R. Fielder | | | | | | | | | | | | | |

BATTING ORDER is always the SAME

FIG. 3   Can be copied for each game.

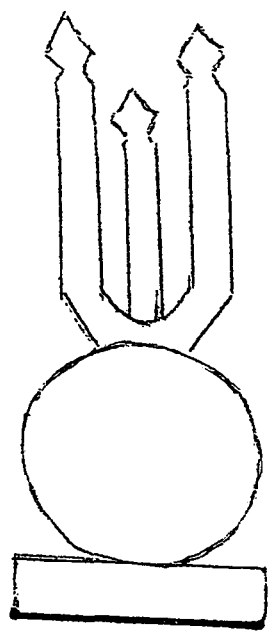
FIG. 4  Base

ORANGE Team

*Manager*

*Plate Umpire*

*Pitcher*

*Right Fielder*

*Center Fielder*

*Left Fielder*

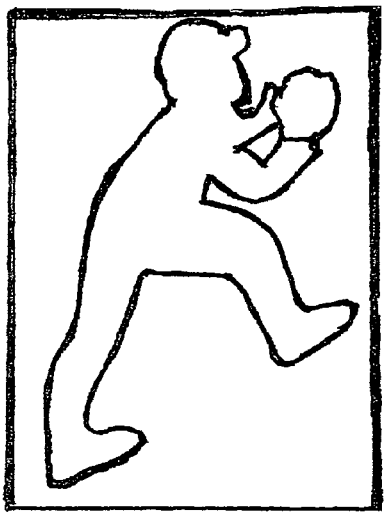
1st Base
FIG.11
ORANGE TEAM
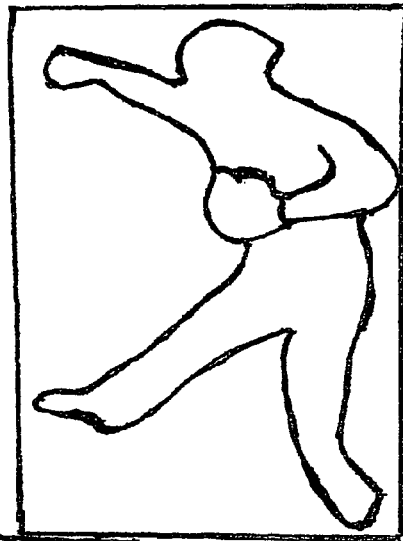
3rd Base
FIG.13
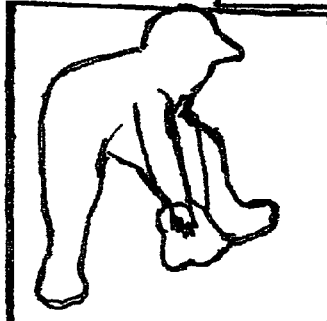
2nd Base
FIG.12
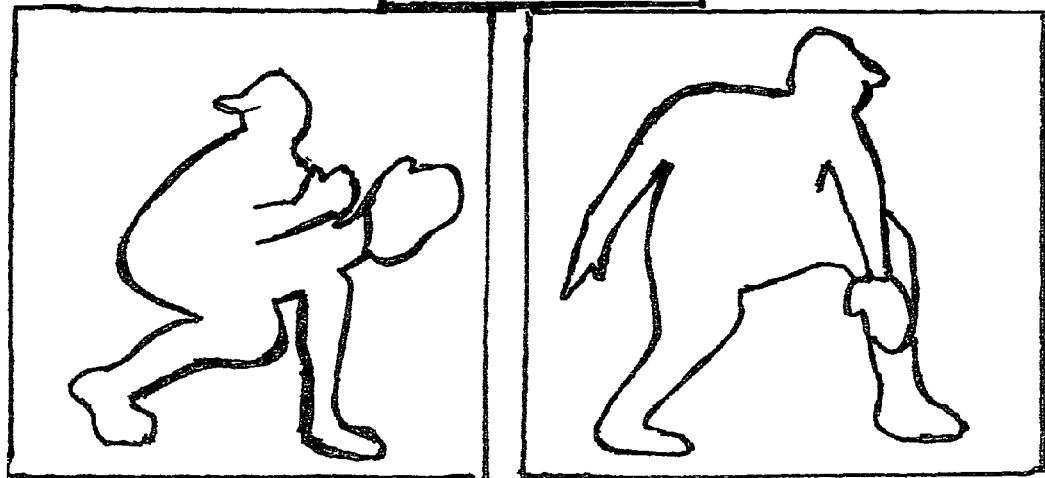
catcher
FIG.14
Short stop
FIG.15

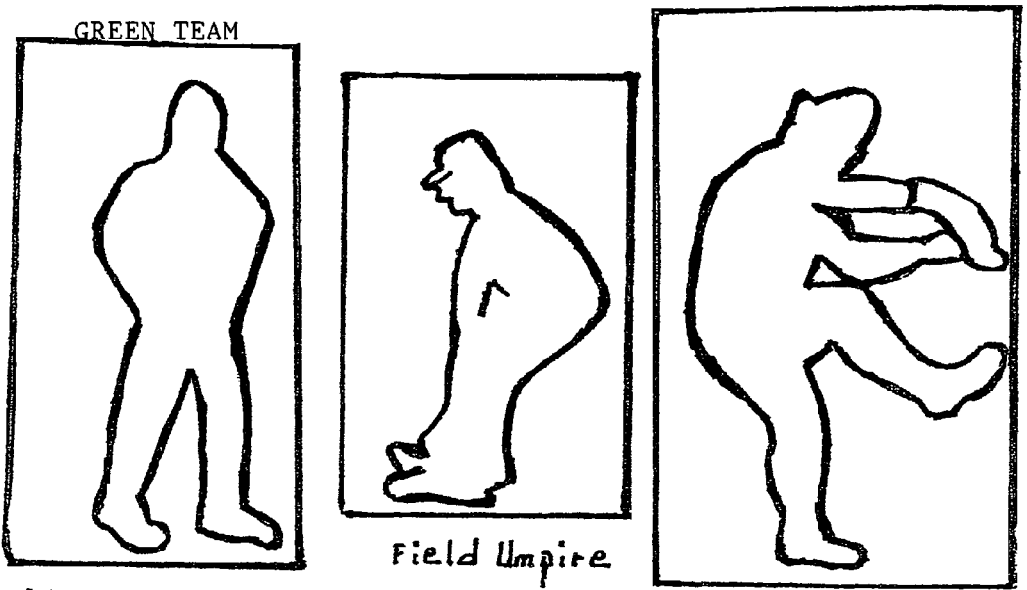
Manager FIG. 16
Field Umpire FIG. 17
Pitcher FIG. 18
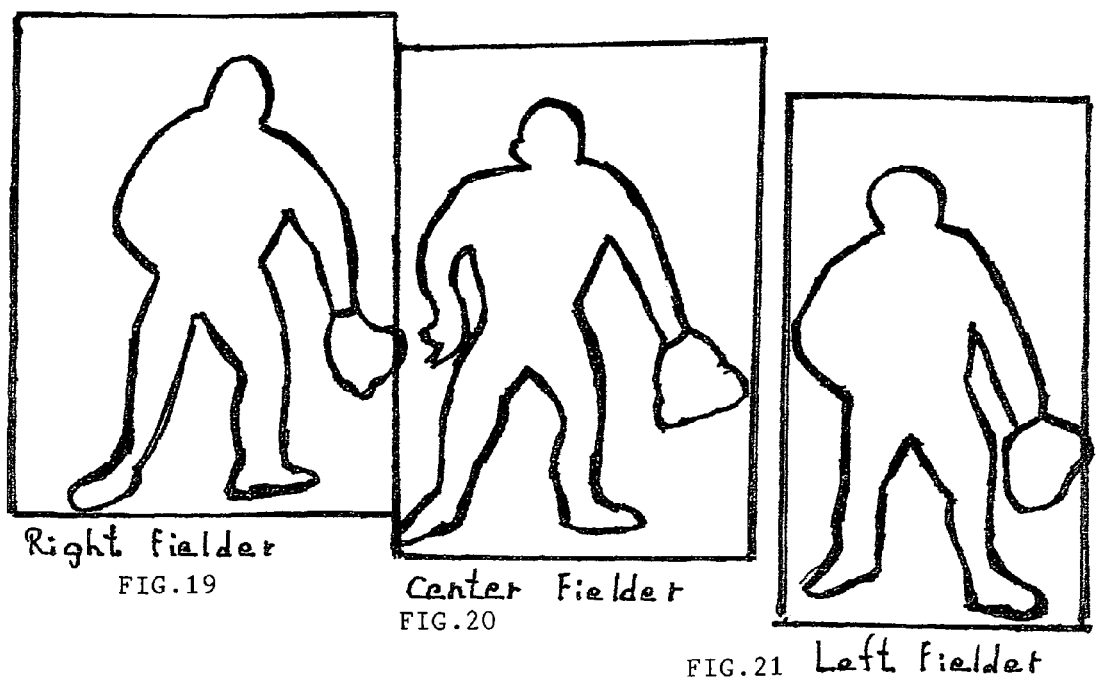
Right Fielder FIG. 19
Center Fielder FIG. 20
FIG. 21 Left Fielder GREEN TEAM
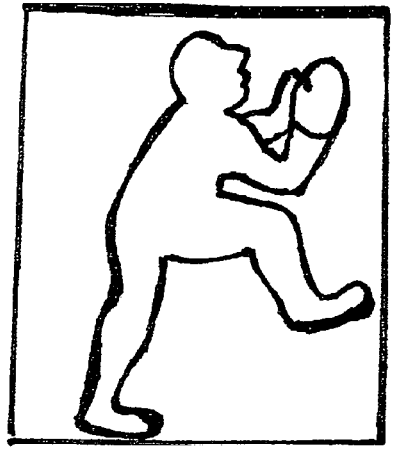
1st Base FIG.22
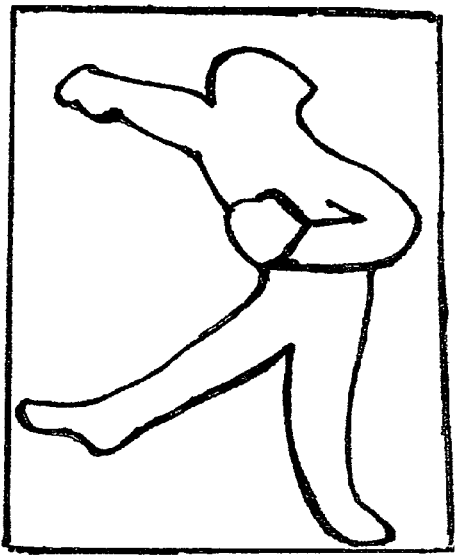
3rd Base FIG.24
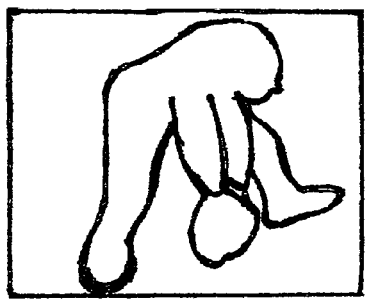
2nd Base FIG.23
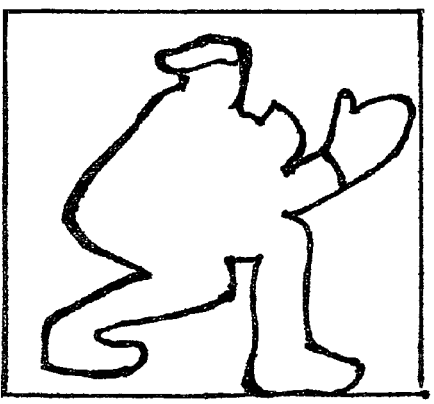
Catcher FIG.25
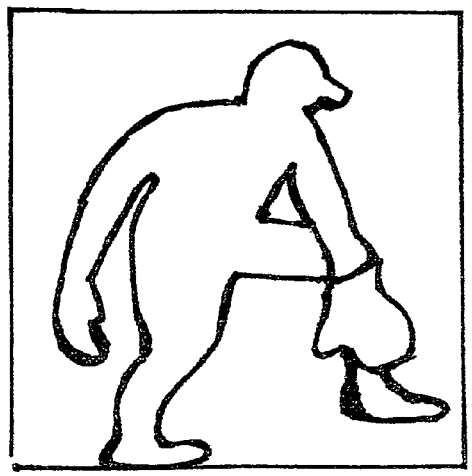
Short Stop FIG.26

LANGUAGE STUDY GAME BOARD

BACKGROUND OF THE INVENTION

Development of the GRAMMALL game began with the request of another teacher in the Primary Level of public school where I was certified K-12 in Speech, English and Reading and a Reading Specialist for the ED/LD Program. She had a problem with maintaining interest and being able to teach vocabulary. She asked me to design an aid. Circumstances including a move slowed the development of what has become GRAMMALL.

Retention of knowledge from grade level to level has always been a problem, in part due to lack of opportunity to use newly acquired information or intergrate it with personal experience. That is what GRAMMALL is designed to overcome. The means to do so are professionally identified and approved in individual contexts; GRAMMALL unifies them not only in one context but also in an appealing and familiar way.

BRIEF SUMMARY OF THE INVENTION

GRAMMALL is a unique and imaginative way to play Baseball with a board game. Game pieces are team members who represent the nine positions of Baseball and also the nine parts of speech. The board is a stylized Baseball field. Players compete in making sentences to make runs and walks to win the game. A fun vocabulary all about people can be substituted with any subject or career vocabulary to have a unique learning experience. Two to twenty-two persons can play at the same time from age five on. Vocabulary and sentence requirements increase in complexity with each level.

BRIEF DESCRIPTIONS OF THE DRAWINGS

Figure 6:
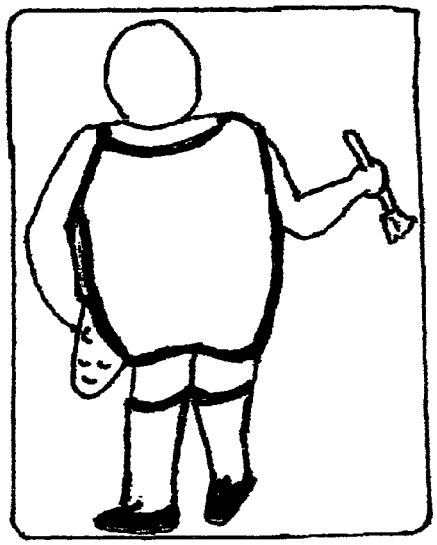
Figure 7:
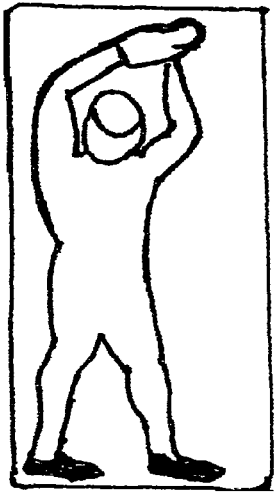
Figure 8:
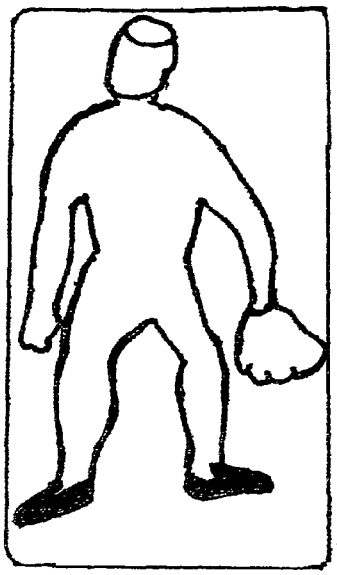
Figure 9:
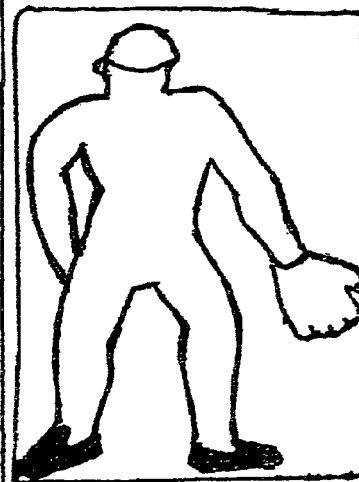
Figure 10:
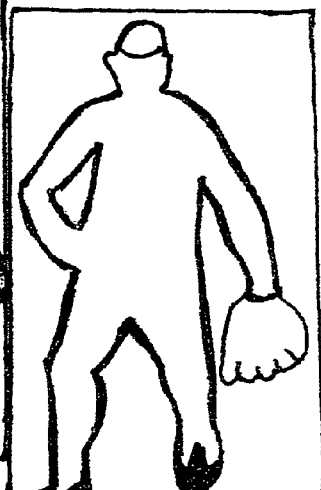

FIG. 1: Trademark and Title
FIG. 2: Gameboard
FIG. 3: Scorecard that can be copied for. each game
FIG. 4: Design of wooden and plastic base to hold laminated pictures of team members
FIGS. 5-10: Orange team members Manager; Umpire; Pitcher; Right, Center, and Left Fielders
FIGS. 11-15: Orange team members First, Second, and Third Base; Catcher; Short Stop
FIGS. 16-21: Green team: Manager; Umpire; Pitcher; Right, Center, and Left Fielders
FIGS. 22-26: Green team First, Second, and Third Base; Catcher; Short Stop

DETAILED DESCRIPTION OF THE INVENTION

GRAMMALL LANGUAGE LEARNING INSTRUMENT is a game invented and designed by Arnot Dawn Havis Libby in 1981 and is correlated with Baseball and its general rules. It was revised in 2008 when the Manual was copyrighted; in 2009 the Trademark was registered and a Patent Pending status acquired.

Descriptions of the essential Drawings (8) begin with D-1; it shows the Trademark design used on the box top and copyrighted Manual cover. All drawings are included in the Manual.

The unique name of GRAMMALL DENOTES THAT ALL Grammar—the nine parts of speech and the nine parts of a sentence—are used and both are matched with the nine positions of Baseball. Team members forming the game pieces represent both a position in Baseball and a part of speech.

GRAMMALL is not to be confused with any other visual aid for merely learning the English language. While GRAMMALL's repeated, guided use of correct sentence construction and word use is an aid to the betterment of speech, what is significant is the improved way in which this is done and vocabulary is introduced and used for learning.

Vocabulary all about people is provided for fun. For learning, vocabulary from any subject or career can be substituted. Either is enjoyable competition and tactile activity combined in the unique board game. From two to twenty-two persons can play at one time and from age five on.

Pages two through six give a DETAILED DESCRIPTION OF THE INVENTION's components.

Pages seven through ten of the DESCRIPTION explain the use of the game in further details.

Page eleven is the CLAIM.

Page twelve is the ABSTRACT.

FIG. 2 shows the GRAMMALL Gameboard as it actually is on 22"×27" posterboard at the time. It folds in quarters to fit in the box. It could be manufactured of stiffer cardboard and still fold.

The Defense Team Positions are shown in the usual Baseball locations. The schematic design is shown in the Manual. The Positions are identified with Parts of Speech. Defense Players select the different Parts for the Offense Team to use in making sentences from the Vocabulary used. As the Offense Batters select the appropriate Subject and Sentence Parts, Runs and Walks are made. The Team with the most Runs and Walks at the Game's end wins.

While the Gameboard could be enlarged, it should not be smaller to accommodate the possible 22 Players. The Team Member Game Pieces are held and moved by the Players. While the Game could be spread out on the floor or rug, it is suggested the flat surface be a table or open-sided counter.

What each Player at each Position can require for the sentence to be made by the Offense is briefly written on the Gameboard. More details are on the Game Pieces as explained with the drawings and in the written description which follows.

The correlation with Baseball is original in that the nine positions of Baseball are matched to the nine Parts Of Speech and the nine Parts Of A Sentence.

FIG. 3 pictures the Scorecard as it is in the Manual to be used in playing GRAMMALL. It is on graph paper in a clear plastic envelope with fold down top. The envelope is part of the Manual, and the top is attached at the Left side. To use the insert of the Scorecard by repeated copying, the direction is written to cut loose the Left side of the fold down top flap.

The graph paper is ideal to provide lines for the entries. Below each Position for the two Teams, Orange and Green, is room for that Player's name. Each nine for both Teams is listed.

As shown, S=an out for a Player. R=a Run for a Player. W=a Walk for a Player. An S in a Square=a Strikeout at Bat. Three Strikeouts ends that Team's time at Bat, and the other Team starts their time at Bat. An Inning is when each Team has had one consecutive time at Bat.

A Run occurs (R) when the Batter Up moves to First Base with the correct choice of a Subject from the Vocabulary List that is being used. A Run (R) is scored with each move to the next Base with the correct addition to the sentence that is begun by that Player. This is done each time a new Batter Up starts another sentence whether the Batter Up makes a correct start or not. Defense selects the kinds of words for Offense to use.

Should the Runner make an incorrect addition to his or her sentence, then a simple S is scored, and the Player leaves the Game for that Inning.

An S in a Square Strikeout at Bat doesn't put other Runners out. If it is the THIRD Strikeout, then each Runner on a Base may make one more Run by adding one more correct part to the sentence each has started. Anyone striking out at Bat is OUT for the Game. As many Innings as determined may be played at one time.

As detailed in the Manual, if a Batter Up is slow in selecting a Subject according to the TIME allowed at each LEVEL, a Runner on Base can make a SUITABLE Interjection. If the exclamation is correct, the Runner moves to the next Base and scores a Walk (W). Then the Batter Up avoids a possible Strikeout and receives another verb Pitch. The Team Mgr. watches to advise such a need. An unsuitable interjection puts only the Runner out with an S.

Only a Runner on First Base or Second Base can make an Interjection: a correct Interjection scores a Walk (W), and NO Walks are allowed from Third Base. Also Interjections are not listed in the provided Vocabulary after Level Four, but can be continued if desired.

For LEVELS FIVE, SIX, AND SEVEN and on, if a Runner's choice is in Error BUT the Baseman at that next Base cannot correct the Error, then the Runner may move to the next Base anyway and score a Walk (W).

At LEVEL EIGHT when a Runner is not sure what to select, then the Runner may challenge the indicating Defense Fielder to make the selection instead. Should the Fielder be able to do so, the Runner scores a Strike (S) and is out for the Game. Should the Fielder not be able to do so, then the Runner moves on to the next Base and scores a Walk (W).

All these procedures are explained in the Manual as they are introduced at each LEVEL. There is a Scorekeeper to be chosen for each Game. The Scorekeeper can be one of the Umpires or a Manager and alternate with Innings. The Scorekeeper can be the Supervisory Person when GRAMMALL is used for Learning and not Entertainment.

When GRAMMALL is used for Learning (and for Entertainment if desired) a RECORDER other than the Players needs to be selected to Record all the sentences composed. This is to provide an Aid for further study of the Vocabulary provided or of the Vocabulary's SUBJECT if that has been substituted. When Grammall is used for Learning, all Players keep a written record of the sentences composed, as the Game progresses.

Even with GRAMMALL being played for Entertainment only, each Player should keep a written record of their own sentence as they compose it from Base to Base.

The TEAM with the highest Total of all its Runs and Walks WINS.

FIG. 4 depicts the design of the actual wooden and plastic BASE for LAMINATED PICTURES OF THE TEAM PLAYERS.

The circular wooden bottom is covered with green fell for ease of movement on the Gameboard, which is a prototype to go with it. The Base is 1" in diameter, ¼" in thickness and made of WOOD painted white.

The wooden Ball on top of the Base is 1" in diameter and 1" tall and made of wood painted white. Wood provides the weight to hold the Insertions of the Drawings of the Team Players.

The clear plastic Prongs are flat and ¹⁄₁₆" thick. At the Center the prong is 1¼" tall from the Base. The center prong is 1" tall. The two side prongs are 1⅛" tall.

The LAMINATED PICTURES OF THE TEAM PLAYERS are inserted with the center prong in front and the two side prongs in back.

The GRAMMALL Bases and Insertions are proportioned larger than the Gameboard Field for ease of identity. The measurements of the prototypes are given to provide a comparative means of manufacturing the Game of GRAMMALL in a larger size if desired. The size of it as designed and made is as small as it should be.

FIGS. 5-15 are of the ORANGE TEAM. FIGS. 16-26 are of the GREEN TEAM.

The distinction between the two is with three Team Members. For the GREEN TEAM the Manager is pictured as a Male Gender. For the ORANGE TEAM the Manager is pictured as a Female Gender. The Pitchers have a different stance. The GREEN TEAM Umpire is a Field Umpire. He determines that the Defense is following the RULES. The ORANGE TEAM Umpire is a Plate Umpire. He determines that the Offense follows the RULES.

Since women usually play softball and men baseball, Players are designed as Two Teams of Men. However, any Gender can play and can play any Position.

The flat laminated Team Figures for playing GRAMMALL WERE DRAWN ON SQUARE-EDGED PAPER AND CUT OUT IN DIFFERENT SIZES. The FRONT is shown for each in the exact size in the prototype. On the Jersey FRONT is the name of the Baseball Position of that playing piece. On the BACK of each as described IN THE FOLLOWING DESCRIPTION is what PART OF THE SENTENCE the Offense Players must add at that point. This is also WRITTEN ON THE GAMEBOARD WHERE that Player is located.

Each Defense piece is raised by the Player when the Player selects the SENTENCE PART to be used and then replaced on the Field. Players on the Offense move their pieces as they play and remove them when Home Plate is reached or they are out.

The Batting Order from Baseball is used and remains the same as shown on the scorecard. However, as a new Inning starts where the Batting Order left off for the Team up to Bat is where the turns start. This assures each player of getting at least one turn.

While Drawings of the Team Members could be improved for marketing, as mentioned, neither the Gameboard content nor the functions and positions of the Team Members is to be changed.

For any Players needing them, three original REVIEWS, labeled 1st, 2nd, and 3rd Base give simple, clear Guides to the nine PARTS OF SPEECH, the nine PARTS OF A SENTENCE, and the basic Rules and original Examples for identifying letter sounds and word pronunciation.

Each LEVEL's originally selected Vocabulary List is categorized by the nine PARTS OF SPEECH to make playing easier in composing the sentences.

GRAMMALL has Twenty-two Game Pieces, as the Drawings show. Two are Managers and Two are Umpires. Two Team sets of the nine Positions on Baseball Bases and in the Field are also shown in the Drawings. Any Player can also be a Manager or an Umpire. The flat laminated drawings can be assigned or drawn.

While the colors of GREEN AND Orange are used for the GRAMMALL Teams originally, any uniform colors for schools or professional teams can be substituted if requested for manufacturing by contacting the owner.

However, on the FRONT of each Team's Jersies MUST be printed which of the nine positions each piece represents: Pitcher, Catcher, Short Stop; Right, Center, or Left Fielder; First, Second, or Third Base. On the BACK of each Team's Jersies MUST be printed the Basic Sentence Function that each Position controls to match the descriptions on the Gameboard and in the Manual.

While correctness rather than speed is emphasized, there is carefully determined TIMING for answering at each LEVEL. For this it is listed in the Manual as a need, not provided, to have a TIMER.

A means for displaying the Vocabulary selected is also mentioned as a need not provided with the Game. Players provide their own pencils and paper for Recording the Sentences.

The nine PARTS OF SPEECH for listing the Vocabularies are: Articles, Nouns, Pronouns, Adjectives, Verbs, Adverbs, Prepositions, Conjunctions, and Interjections. Examples of Word Parts and the Parts of a Verb are also shown in Examples.

Playing GRAMMALL

The order of Defensive playing has six steps before the 7th when the Offense Team's Batter Up chooses a compatible subject from the selected Vocabulary for the Hit and Run to First Base.

1st the Catcher selects the Subject Type; this goes from Noun only at Level One on to added Pronoun at Level Two and on. By Level Four the Subject can also be an Infinitive, Prepositional Phrase, or Gerund; By Level Eight The Batter Up can be told that a Subordinate Clause must be used as Subject.

2nd the First Baseman calls the Subject Gender of the Noun or Pronoun that the Batter Up must use when either is the Subject.

3rd the Short Stop determines the Subject's number, Singular or Plural, and the Verb's Person.

4th the Fielders rotate turns deciding the Verb Mood as those choices increase after Level Two.

5th the Basemen rotate turns saying which Voice, Active or Passive, the Verb being Pitched is to have.

6th the Pitcher states the Verb choice in accord with the previous stipulations of the first five steps. The Pitcher also chooses the Verb Tense to be used, though Level One uses only the Present Tense.

At the Levels indicated in the Rules, the Second Baseman selects whether the Offense Runner adds an Adjective or a Direct Object to run to Second Base.

Likewise, the Third Baseman selects whether an Adverb or Indirect Object is to be added to the sentence for the Runner to go on to Third Base.

By Level Four, the Left Fielder chooses which conjunction the Runner must use for the required Compound Clause. However, on the added Compound Clauses and later Complex Clauses the Runner selects the words wanted for the Clauses.

By Levels Five, Six, and Seven a Left Fielder selects the Complex Clause Conjunction for the Offense Runner; by Level Eight on both Conjunctions to be used in the Sentence for the required Compound Complex Sentence are stated by the Left Fielder.

At Level Three on, a Center Fielder selects the Place In The Sentence for a Prepositional Phrase using TO as an Infinitive Part or for a Direct Object.

At Level Three on the Right Fielder determines which Type of Adverbial Phrase is to be used by the Runner: one that states where, why, when, or how.

All these more detailed descriptions of Functions for the two Teams' Members are beside Drawings of them in the Copyrighted Manual for GRAMMALL. This explains the use of Language Learning in the descriptive name of GRAMMALL's Trademark.

Vocabulary

The exemplary functional Word Lists are original in selection, as mentioned. They are related to people and their activities. By repeatedly using guided correctly formed Sentences with them or any substituted Subject's Vocabulary, Players can improve their Speech.

Level One Words include mainly sight words and common primary selections.

At Level Two Pronouns are introduced and listed; familiar home and primary school words, including Adjectives and Adverbs, are shown; Verb Gerunds, Participles, and Infinitives are added and explained; and Present, Past, and Future Tense are shown.

By Level Three the Imperative Verb Mood is introduced as well as some of the Irregular Verbs and their forms. Compound Clauses begin. Examples of Colors as Nouns and Adjectives are shown. Direct and Indirect Objects are explained and added to the Sentence requirements. Written Numbers are shown. Words about our Earth and Universe where people live are listed.

While at any Level Words from previous Levels may be used, especially in the Runner's choices for Clauses, the use of each Level's new Words is encouraged as first choice.

A long List of Irregular Verbs and all their Parts is inserted for use at Level Three and on.

Level Four words are about peoples' various forms of government, and Prepositions are given special emphasis.

Level Five has an extensive Word Set of Word Lists in four categories: the body and health, eating, clothing, and shelter. The Subordinate Clauses begin for Complex Sentences.

Protection for people and the Military Armed Forces comprise the Word List for Level Six. Phrases are reviewed and their uses and additional uses of Subordinate Clauses.

Level Seven Words are about peoples' Travel.

Level Eight Words are about the businesses of people. Sentences have become Compound Complex, and all along the Conjunctions for these are shown.

Level Nine Words are about the studies and places of learning available for people. By now three to five syllable words are being used.

Level Ten is about the Fine Arts and sports people enjoy. The Vocabulary of the two categories is separated Level Eleven Words reveal the variety of careers people can choose.

Level Twelve Vocabulary lists the vastness of the intangibles people can experience, the understanding of which is essential to be prepared for further education and development. As before, Sentence examples are given for this critical part of peoples' lives. Also, as on all Levels, the Words are all listed by Parts Of Speech.

This concludes the detailed description of GRAMMALL, how to play it, and of what it consists as an original Vocabulary Game that is correlated with Baseball. The final page of its extensive and copyrighted Manual ends with the Imperative, "Happy Innings"

The invention claimed is:

1. A game apparatus for teaching use of the parts of speech, comprising:
   a playing board having a representation of a baseball field thereon;
   a plurality of cards, wherein each card comprises a representation of a baseball player and a baseball position, and each card further comprises indicia corresponding to one of nine parts of a sentence;
   a plurality of holders adapted to support the cards vertically for placement upon the playing board; and
   an instruction manual comprising instructions for playing the game and a plurality of lists of words, where each list of words corresponds to one of the nine parts of a sentence represented on the playing cards, whereby the game is scored by a player scoring runs and walks by forming sentences.

2. The game apparatus of claim 1 wherein the plurality of cards are provided in two sets of eleven, each set corresponding to a baseball team and comprising cards representing a pitcher, a catcher, a first baseman, a second baseman, a shortstop, a third baseman, a left fielder, a center fielder, a right fielder, a manager and an umpire.

3. The game apparatus of claim 1 wherein the nine parts of speech represented in the lists of words are: articles, nouns, pronouns, adjectives, verbs, adverbs, prepositions, conjunctions and interjections.

4. The game apparatus of claim 1 wherein a plurality of sets of lists of words are provided, each set corresponding to a different level of difficulty for sentence construction.

5. The game apparatus of claim 4 comprising twelve levels of difficulty for sentence construction.

6. The game apparatus of claim 1 further comprising a scorecard corresponding to a standard baseball scorecard, whereby a user is enabled to score the game in the manner of a baseball game and whereby the team scoring the most runs and walks wins the game.

* * * * *